(12) United States Patent
Ukon

(10) Patent No.: US 7,477,645 B2
(45) Date of Patent: *Jan. 13, 2009

(54) ATM CONNECTION BAND CONTROL METHOD AND CONTROL SYSTEM

(75) Inventor: Shinichi Ukon, Tokyo (JP)

(73) Assignee: Juniper Networks, Inc., Sunnyvale, CA (US)

( * ) Notice: Subject to any disclaimer, the term of this patent is extended or adjusted under 35 U.S.C. 154(b) by 711 days.

This patent is subject to a terminal disclaimer.

(21) Appl. No.: 11/072,629

(22) Filed: Mar. 7, 2005

(65) Prior Publication Data

US 2005/0195825 A1    Sep. 8, 2005

Related U.S. Application Data

(63) Continuation of application No. 09/760,781, filed on Jan. 17, 2001, now Pat. No. 6,914,904.

(30) Foreign Application Priority Data

Jan. 18, 2000    (JP)    ............... 2000-009445

(51) Int. Cl.
*H04L 12/28* (2006.01)
*H04L 12/56* (2006.01)

(52) U.S. Cl. ............ 370/395.2; 370/395.4; 370/395.43; 370/399

(58) Field of Classification Search .............. 370/395.2, 370/395.4, 395.43, 399
See application file for complete search history.

(56) References Cited

U.S. PATENT DOCUMENTS

| | | | | |
|---|---|---|---|---|
| 5,490,141 A | * | 2/1996 | Lai et al. .................... | 370/352 |
| 5,894,471 A | * | 4/1999 | Miyagi et al. ............... | 370/230 |
| 5,953,338 A | * | 9/1999 | Ma et al. ............... | 370/395.21 |
| 6,091,730 A | | 7/2000 | Biegaj et al. ............. | 370/395.2 |
| 6,091,731 A | | 7/2000 | Biegaj et al. ............. | 370/235.1 |
| 6,122,252 A | | 9/2000 | Aimoto et al. .............. | 370/235 |
| 6,144,636 A | * | 11/2000 | Aimoto et al. .............. | 370/229 |

(Continued)

FOREIGN PATENT DOCUMENTS

JP    5-61119    3/1993

(Continued)

OTHER PUBLICATIONS

"Traffic Management Specification Version 4.0"; The ATM Forum Technical Committee; Apr. 1996; 107 pages.

*Primary Examiner*—Alpus H Hsu
(74) *Attorney, Agent, or Firm*—Harrity & Harrity, LLP

(57) ABSTRACT

An asynchronous transfer mode (ATM) connection band control system in an ATM network may include a memory to store band acquiring data associated with one or more preferential switched virtual connections (SVCs) having high preference in the ATM network. The band acquiring data may include band data for preliminarily acquiring a band for the one or more preferential SVCs. The ATM connection band control system may also include a control portion to perform connection admission control such that a band for one of the preferential SVCs with band acquiring data in the memory is guaranteed regardless of whether a connection for the one of the preferential SVCs is established, and the band for the one of the preferential SVCs is available to a non-preferential SVC when the connection for the one of the preferential SVCs is not established.

26 Claims, 10 Drawing Sheets

U.S. PATENT DOCUMENTS

| | | | |
|---|---|---|---|
| 6,169,735 B1 * | 1/2001 | Allen et al. | 370/352 |
| 6,226,263 B1 | 5/2001 | Iwase et al. | 370/231 |
| 6,275,493 B1 * | 8/2001 | Morris et al. | 370/395.4 |
| 6,282,197 B1 * | 8/2001 | Takahashi et al. | 370/395.1 |
| 6,389,026 B1 | 5/2002 | Kozaki et al. | 370/398 |
| 6,411,617 B1 * | 6/2002 | Kilkki et al. | 370/353 |
| 6,445,703 B2 | 9/2002 | Sakurai et al. | 370/391 |
| 6,456,630 B1 * | 9/2002 | Packer et al. | 370/466 |
| 6,463,057 B1 | 10/2002 | Kozaki et al. | 370/358 |
| 6,473,432 B1 | 10/2002 | Nishimura et al. | 370/412 |
| 6,549,533 B1 * | 4/2003 | Campbell | 370/351 |
| 6,594,265 B1 * | 7/2003 | Etorre et al. | 370/395.51 |
| 6,597,689 B1 * | 7/2003 | Chiu et al. | 370/354 |
| 6,600,720 B1 * | 7/2003 | Gvozdanovic | 370/230 |
| 6,657,958 B1 * | 12/2003 | Tanaka | 370/230.1 |
| 6,687,228 B1 * | 2/2004 | Fichou et al. | 370/232 |
| 6,690,678 B1 * | 2/2004 | Basso et al. | 370/468 |
| 6,707,820 B1 * | 3/2004 | Arndt et al. | 370/395.2 |
| 6,735,204 B1 | 5/2004 | Wang et al. | 370/395.1 |
| 6,738,385 B1 | 5/2004 | Iwamoto | 370/412 |
| 6,754,206 B1 * | 6/2004 | Nattkemper et al. | 370/369 |
| 6,771,650 B1 * | 8/2004 | Veeneman et al. | 370/397 |
| 6,822,961 B1 * | 11/2004 | Constantinof et al. | 370/395.2 |

FOREIGN PATENT DOCUMENTS

| | | |
|---|---|---|
| JP | 6-30021 | 2/1994 |
| JP | 9-49985 | 2/1997 |
| JP | 11-160793 | 6/1999 |

* cited by examiner

ATM CONNECTION BAND CONTROL METHOD AND CONTROL SYSTEM

RELATED APPLICATION

This application is a continuation of U.S. patent application Ser. No. 09/760,781 filed Jan. 17, 2001, now U.S. Pat. No. 6,914,904 the disclosure of which is incorporated herein by reference.

BACKGROUND OF THE INVENTION

1. Field of the Invention

The present invention relates generally to an asynchronous transfer mode (ATM) connection band control method and a control system. More particularly, the invention relates to an ATM connection band control method and a system effectively using connection bands which respective ATM circuit ports have.

2. Description of the Related Art

In FIG. 9, the conventional ATM connection band control system includes an input circuit 1, an input buffer control portion 2c, an ATM switch control portion 3c and an output buffer control portion 4.

The input buffer control portion 2c includes a buffer accumulation memory 21c for accumulating input cells before feeding to an ATM switch, an input buffer function portion 22c performing writing control of ATM cells to a buffer accumulation memory and queue management of the buffer, a usage parameter control (UPC) portion 23c monitoring whether a traffic of a user in communication exceeds a band declared upon switched virtual connection (SVC) setting demand or not, a connection admission control (CAC) portion 24c controlling whether a demand is to be admitted or not upon reception of signaling of connection setting demand for new SVC of constant bit rate (CBR), a real time variable bit rate (rt-VBR), a non-real time variable bit rate (nrt-VBR), a buffer control memory 26c storing parameter or data necessary for operation of the input buffer function portion 22c and the usage parameter control (UPC) portion 23c, and a circuit interface control portion 20c interfacing the input buffer function portion 22c and the input circuit 1 for feeding the input cell to the ATM switch.

The ATM switch control portion 3c includes an ATM switch 30c performing switching of the ATM cell, CPU 31c performing central control process of overall system and a main memory 32c for residence of operation program or data necessary for operation of CPU 31c.

FIG. 10 is a detailed block diagram showing a buffer control memory 26c relating to the connection band of SVC of FIG. 9 and its peripheral control portion. The buffer control memory 26c includes a memory 261c storing band data per declared connection upon SVC setting demand necessary for control operation of the usage parameter control (UPC) portion 23c, a memory 263c storing connection band data of SVC of CBR, rt-VBR, nrt-VBR, and a memory 264c for storing data necessary for other connection admission control, such as available band of ATM circuit port and so forth.

Only connection band data of SVC of currently established connection is present in the buffer control memory 26c for performing connection admission control and connection band control.

In this case, the connection band control and the connection admission control is performed for acquiring necessary connection band in first-come-first-set order without considering connection band of preferential SVC when the SVC of established connection issues setting demand. Therefore, when connection of the preferential SVC is not yet established and issue setting demand for connection later, the SVC setting demand is not always admitted and can be rejected until the necessary band is released in certain remaining band of the ATM circuit port.

On the other hand, even when the connection of the preferential SVC is established, if the preferential SVC is deleted once, the connection band acquired unconditionally is released. Therefore, even when the preferential SVC issues setting demand again, there is not guarantee to acquire connection band. If other SVC sets the connection earlier, the setting demand may be rejected until the necessary band is released in certain remaining band of the ATM circuit port.

In the foregoing conventional ATM band control method, the first problem is that, in acquiring of the connection bands of each SVC of the CBR, rt-VBR, nrt-VBR requiring fixed band, the connection admission control (CAC) performing control on the basis of the band information of those actually established connection to acquire the band for those established connection at earlier timing for finite connection bands of each ATM circuit port. However, judgment is not made whether acquiring of band has to be done preferentially or not.

The second problem is that there is not means for preliminarily registering data for setting the band of the connection to be preferentially assigned without actually establishing connection and making judgment upon establishing connection.

The third problem is that when connection for SVC having high preference (preferential SVC) among SVCs is temporarily released for some hindrance to open the band, if the preferential SVC is recovered from hindrance and the preferential SVC demands resetting of connection and connection setting demand for other SVC having low preference (non-preferential SVC) is done at earlier timing, since connection setting of the non-preferential SVC is performed normally, there is no guarantee for permitting resetting of the preferential SVC. Therefore, whether resetting of connection is successful or not simply depends on remaining band of the ATM circuit port.

On the other hand, the fourth problem is that there is no means for performing control for ensuring and guaranteeing resetting of connection band for the preferential SVC when the connection band of the SVC having high preference, such as CBR or the like is temporarily deleted and the band is opened, and when the connection setting demand is issued by other SVC having lower preference while the connection of the preferential SVC is deleted. The connection band is inherently acquired in order to demanding of setting irrespective of preferential order. Therefore, for the SVC having high preference while not used constantly, connection has to be maintained irrespective whether the connection is used for communication or not to constantly occupy the connection band.

The fifth problem is that even when the SVC having high preference actually occupies the connection band constantly, the band may be used for the SVC of ATM category service which does not require fixed band, such as available bit rate (ABR), unspecified bit rate (UBR) and so forth as long as not cell flows in the connection. However, in the prior art, even when the connection is not actually used, an idle data is transmitted in CBR, the band acquired by CBR may not be released unless the setting of connection is actually deleted.

SUMMARY OF THE INVENTION

The present invention has been worked out for solving the problems as set forth above.

According to the first aspect of the present invention, an asynchronous transfer mode connection band control method in a system for transmitting and receiving an asynchronous transfer mode cell using an asynchronous transfer mode network, comprises:

first step of preliminarily setting a connection band as band acquiring data for preferential switched virtual connection having high preference in the asynchronous transfer mode network among connections of an asynchronous transfer mode service categories requiring a fixed band, of constant bit rate, in which a traffic is generated at a constant interval in the switched virtual connection via the asynchronous transfer mode network, and a real time variable bit rate or non-real time variable bit rate generating a variable traffic having burst characteristics in transmission rate, such as variable rate video or public network frame relay service; and second step of controlling the connection band including the band acquiring data for enabling cooperation with a connection admission control for the constant bit rate, the real time asynchronous transfer mode and the real time variable bit rate and the non real-time variable bit rate, and performing reception control under a condition where the band for the preferential switched virtual connection is constantly acquired, with controlling the connection band in a range where a band for the preferential switched virtual connection is constantly acquired and guaranteed, a band for a non-preferential switched virtual connection can be constantly acquired upon the connection admission control for the non-preferential switched virtual connection.

In the preferred embodiment, it is preferred that in the first step, the connection band of the constant bit rate, the real time variable bit rate and the non-real time switched virtual connection, is preliminarily set and stored in a buffer control memory irrespective whether a connection of the preferential switched virtual connection is established or not, and in the second step, control is performed with taking the preliminarily set band acquiring data and data necessary for the connection admission control of other connection including the connection band of the switched virtual connection used currently and data necessary for connection admission control.

In the second step, upon reception of a signal for setting demand of new switched virtual connection from a calling terminal, judgment may be made whether the switched virtual connection is the preferential switched virtual connection having high preference and having band being acquired.

In the second step, when the new switched virtual connection setting demand from the calling terminal is for a non-preferential switched virtual connection, connection band may be controlled within a range where the band of the preferential switched virtual connection is certainly maintained irrespective whether the connection of the preferential switched virtual connection, for which the band is already reserved, is established or not by cooperation of a connection reception control processing portion and a connection band controller.

In the second step, when the new switched virtual connection from the calling terminal is the preferential switched virtual connection, for which band has already been reserved, connection admission may be controlled under a condition where a band of the preferential switched virtual connection within a range where the band of the preferential switched virtual connection is certainly maintained.

Data of connection band of the preferential switched virtual connection of the constant bit rate, the real time variable bit rate and the non-real time variable bit rate is set irrespective whether the connection for the switched virtual connection is established or not, and for the preferential switched virtual connection, connection admission control and connection band control may be performed for constantly acquiring the band.

According to the second aspect of the present invention, an asynchronous transfer mode connection band control system in a system for transmitting and receiving an asynchronous transfer mode cell utilizing an asynchronous transfer mode network, comprises:

data storage means for storing a connection band of a preferential switched virtual connection having high preference in the asynchronous transfer mode network being stored preliminarily as a band acquiring data and storing acquired band data of a switched virtual connection currently established connection; and connection band control means for performing control of connection band on the basis of a total number of bands derived by a sum of the band acquiring data and the acquired band data stored in the data storage means.

According to the third aspect of the present invention, an asynchronous transfer mode connection band control method in a method for transmitting and receiving an asynchronous transfer mode cell utilizing an asynchronous transfer mode network, comprises:

providing data storage means for storing a connection band of a preferential switched virtual connection having high preference in the asynchronous transfer mode network being stored preliminarily as an band acquiring data and storing acquired band data of a switched virtual connection currently established connection; and connection band control step of performing control of connection band on the basis of a total number of bands derived by a sum of the band acquiring data and the acquired band data stored in the data storage means.

In the preferred construction, the connection band control means or the connection band control step may add the band acquiring data of the connection band of the switched virtual connection when setting demand for acquiring the connection band for the switched virtual connection is issued and the demand is admitted.

The connection band control means or the connection band control step may transfer the connection band data of demanded switched virtual connection from the band acquiring data to the acquired band data when the switched virtual connection setting demand is issued and the switched virtual connection for which setting demand is issued is the preferential switched virtual connection, for which band data is preliminarily acquired.

The connection band control means or connection band control step may make judgment whether the switched virtual connection setting demand is to be admitted or not on the basis of a total number of bands derived by a sum of the current band acquiring data and the acquired band data when the switched virtual connection setting demand is issued and the switched virtual connection for which setting demand is issued, is not the preferential switched virtual connection, for which band data is preliminarily acquired.

The connection band control means or connection band control step may add the connection band data of the switched virtual connection in the acquired band data when the switched virtual connection setting demand is admitted.

The connection band control means or connection band control step may transfer the connection band data of the switched virtual connection from the acquired band data to the band acquiring data when a switched virtual connection deletion demand is issued and the switched virtual connection is the preferential switched virtual connection for which the band data is preliminarily acquired.

BRIEF DESCRIPTION OF THE DRAWINGS

The present invention will be understood more fully from the detailed description given hereinafter and from the accompanying drawings of the preferred embodiment of the present invention, which, however, should not be taken to be limitative to the invention, but are for explanation and understanding only.

In the drawings.

DESCRIPTION OF THE PREFERRED EMBODIMENT

The present invention will be discussed hereinafter in detail in terms of the preferred embodiment of the present invention with reference to the accompanying drawings. In the following description, numerous specific details are set forth in order to provide a thorough understanding of the present invention. It will be obvious, however, to those skilled in the art that the present invention may be practiced without these specific detailed. In the other instance, well-known structures are not shown in detail in order to avoid unnecessary obscurity of the present invention.

Figure 1:
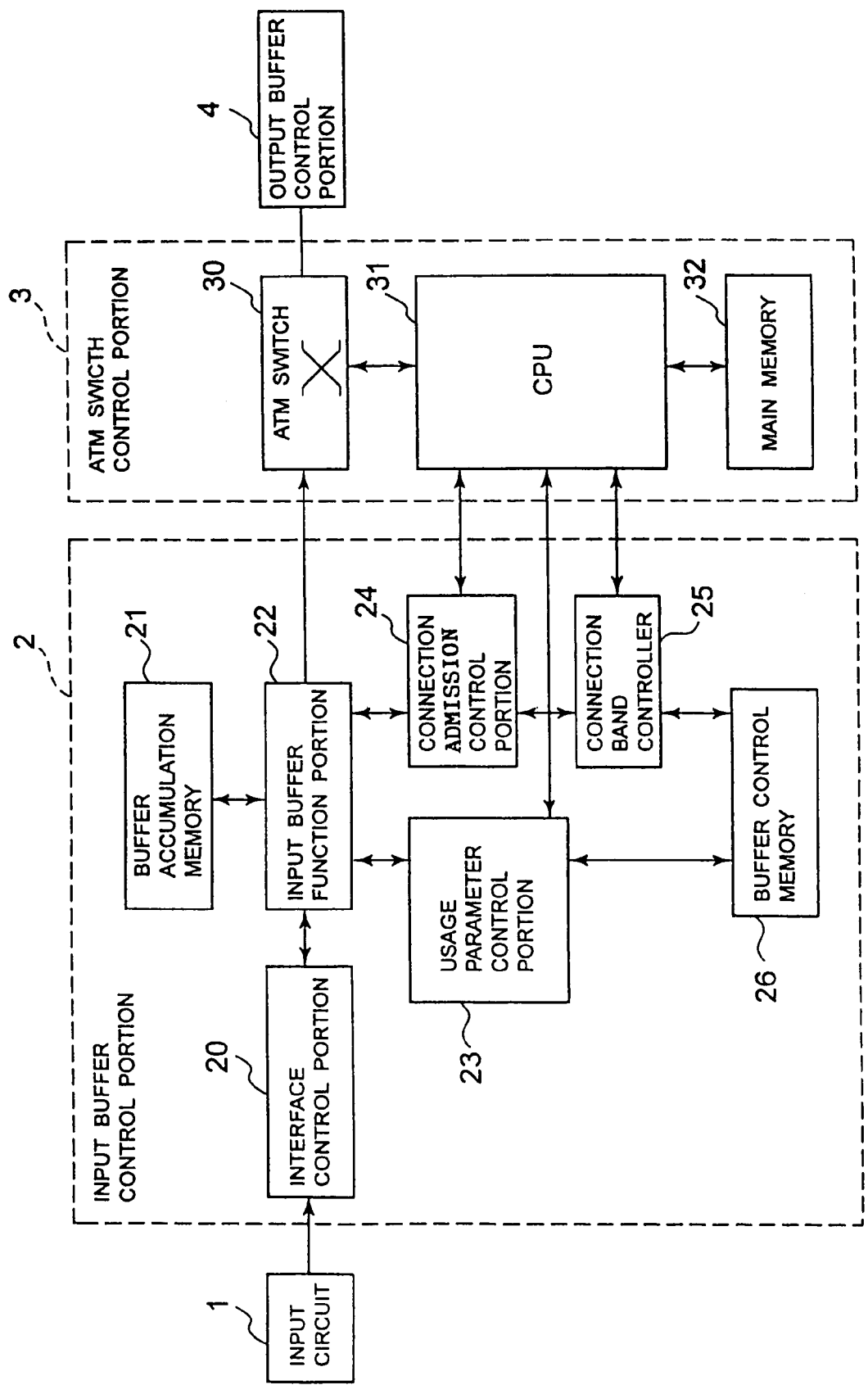
FIG. 1 is a schematic block diagram of the preferred embodiment of an ATM connection band control system according to the present invention.

FIG. 1 is a block diagram showing the first embodiment of an ATM connection band control system according to the present invention. The shown embodiment of the ATM connection band control system includes an input circuit 1, an input buffer control portion 2, an ATM switch control portion 3 and an output buffer control portion 4.

The input buffer control portion 2 includes a buffer accumulation memory 21 for accumulating an input cell before feeding an ATM switch, an input buffer function portion 22 performing queue management of a control buffer for writing an ATM cell in the buffer accumulation memory 21, a usage parameter control (UPC) portion 23 monitoring whether a traffic of the user in communication exceeds a band declared upon demanding setting of SVC or not, a connection admission control (CAC) portion 24 controlling whether a demand is to be admitted or not upon reception of signaling of connection setting demand for new SVC of CBR connection generating a traffic at a predetermined interval via an ATM network from a calling terminal, such as voice, rt-VBR connection or nrt-VBR having variable traffic, in which a transmission rate has burst property, such as variable rate video or a public network frame relay service, a connection band controller 25 performing management or judgment control of connection band data of SVC required for control operation of the connection admission control (CAC) portion 24 and data necessary for other connection admission control such as available band of the ATM circuit port and so forth, buffer control memory 26 for storing parameters and data necessary for operation of the input buffer function portion 22, the usage parameter control (UPC) portion 23, the connection admission controller (CAC) portion 24 and the connection band controller 25, and the interface control portion 20 for interfacing between the input buffer function portion 22 for feeding the input cell to the ATM switch and the input circuit 1.

It should be noted that the connection admission controller (CAC) is a control whether the demand is to be admitted upon receiving signaling of demand of connection setting for the SVC of CBR, rt-VBR and nrt-VBR of ATM service category requiring fixed band, and is a control held inoperative upon receiving signaling of demand of connection setting for the SVC of ABR or UBR in another ATM service category.

Figure 2:
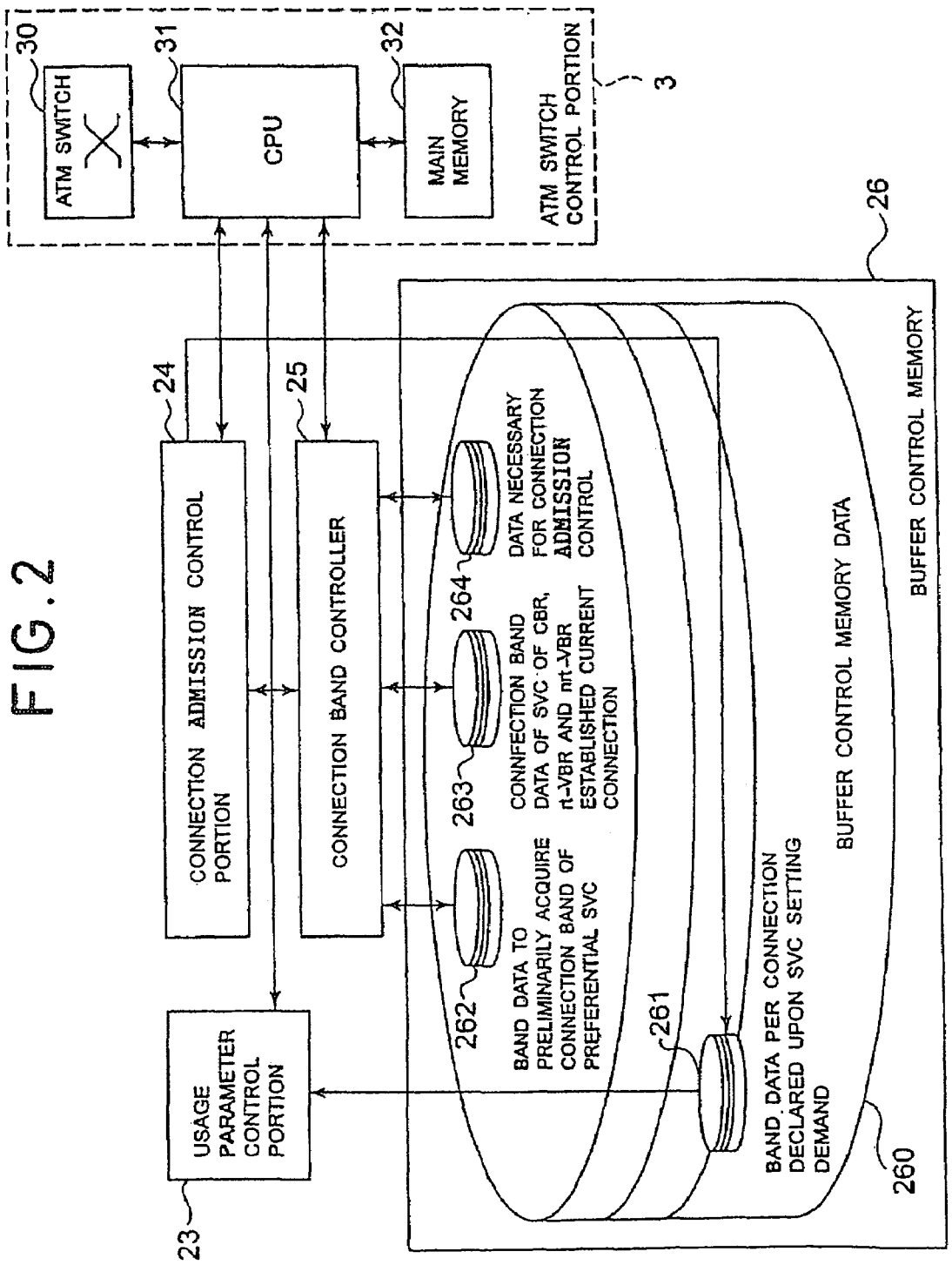
FIG. 2 is a detailed block diagram of the major part of the first embodiment of the ATM connection band control system according to the present invention.

The ATM switch control portion 3 includes an ATM switch 30 performing switching of ATM cell, CPU 31 performing central control process of overall system and a main memory for residence of operation program and data necessary for operation of CPU 31. FIG. 2 is a block diagram showing the buffer control memory 26 relating to the connection band of the SVC and peripheral control portion.

The buffer control memory 26, as data structure in the memory 25 storing the buffer control memory data, includes a memory 261 storing a band data per connection declared upon SVC setting demand necessary for control operation of the usage parameter control (UPC) portion 23, a memory 262 storing band data to preliminarily acquire connection band of the preferential SVC necessary for control operation of the connection band controller 25, a memory 263 storing connection band data of the SVC of CBR, rt-VBR and nrt-VBR established current connection, and a memory 264 storing data necessary for connection admission control, such as available band and so forth of ATM circuit port.

Next, operation of the shown embodiment will be discussed with reference to the drawings. SVC setting demand signaling for establishing connection of the SVC received from the ATM network is fed to the input buffer control portion 2 from the input circuit 1 of FIG. 1 similarly to ATM cell.

At this time, in the input buffer control portion 2, the judgment and control whether the writing and reading in and from the buffer accumulation and the new SVC setting demand by the connection admission control portion 24 are to be accepted or not are performed.

Next, operations of the connection admission control portion 24, the connection band controller 25, the buffer control memory 26 and the usage parameter control portion 23 in FIGS. 1 and 2 will be discussed with reference to FIGS. 3 and 4. In operational flowchart for acquiring connection band of FIG. 3, upon occurrence of setting demand for acquiring connection band for the SVC, content of setting demand of the SVC is checked at step S101. Thereafter, at step S102, judgment is made whether the SVC in question is the setting demand for acquiring the connection band of the preferential SVC preliminarily acquired band data presenting in the memory 262 which stores the band acquiring data of FIG. 2.

A criterion for making judgment whether the SVC, for which setting is demanded, is the preferential SVC, for which the band data is preliminarily acquired, or not, can be made by data which the SVC inherently have upon establishing connection, or a combination of a plurality of data.

As inherent data which the SVC should have upon establishment of connection, there are a virtual path identifier (VPI) value, a virtual channel identifier (VCI) value, an input and output port (number) of the SVC of CBR, rt-VBR, nrt-VBR, ABR, UBR and so forth, and a peak cell rate (PCR), a sustainable cell rate (SCR), a maximum burst size (MBS) as traffic parameter defined at an ATM Forum Traffic Management Specification Version 4.0 (af-tm-0056.000, April, 1996: hereinafter referred to as "TM4.0") and so forth. By one of these or a combination of a plurality of data, the SVC is specified to make judgment whether the setting demanded SVC is the preferential SVC, for which the band data is preliminarily acquired, or not.

When the setting demanded SVC is the preferential SVC, for which the band data is preliminarily acquired, a process for guarding double registration to the memory 262 storing the connection band acquiring data of FIG. 2 is performed by the connection band controller 25 (S103) to terminate the process for connection band acquiring.

On the other hand, when the setting demanded SVC is not the preferential SVC, for which the band data is preliminarily acquired, a total band number derived by a sum of the current band acquiring data stored in the memory 262 and the acquired band data stored in the memory 263 is calculated as a band acquiring judgment reference data (S104). On the basis of the band acquiring judgment reference data and data necessary for other CAC, judgment whether setting demand for acquiring connection band of SVC is admitted or not, is made by the connection band controller 25 (S105).

When judgment is made that the setting demand for connection band acquiring can be admitted in the judgment whether the setting demand of the connection band acquiring of SVC (S106) is accepted or not, process is performed to add the connection band of the SVC to be acquired in the memory 262 storing the band acquiring data in the connection band controller 25 (S107).

On the other hand, at step S106, when judgment is made that the setting demand of connection band acquiring cannot be admitted, for the setting demand of connection band acquiring of SVC, rejection is notified (S108). Then, process for acquiring connection band is terminated.

Figure 3:
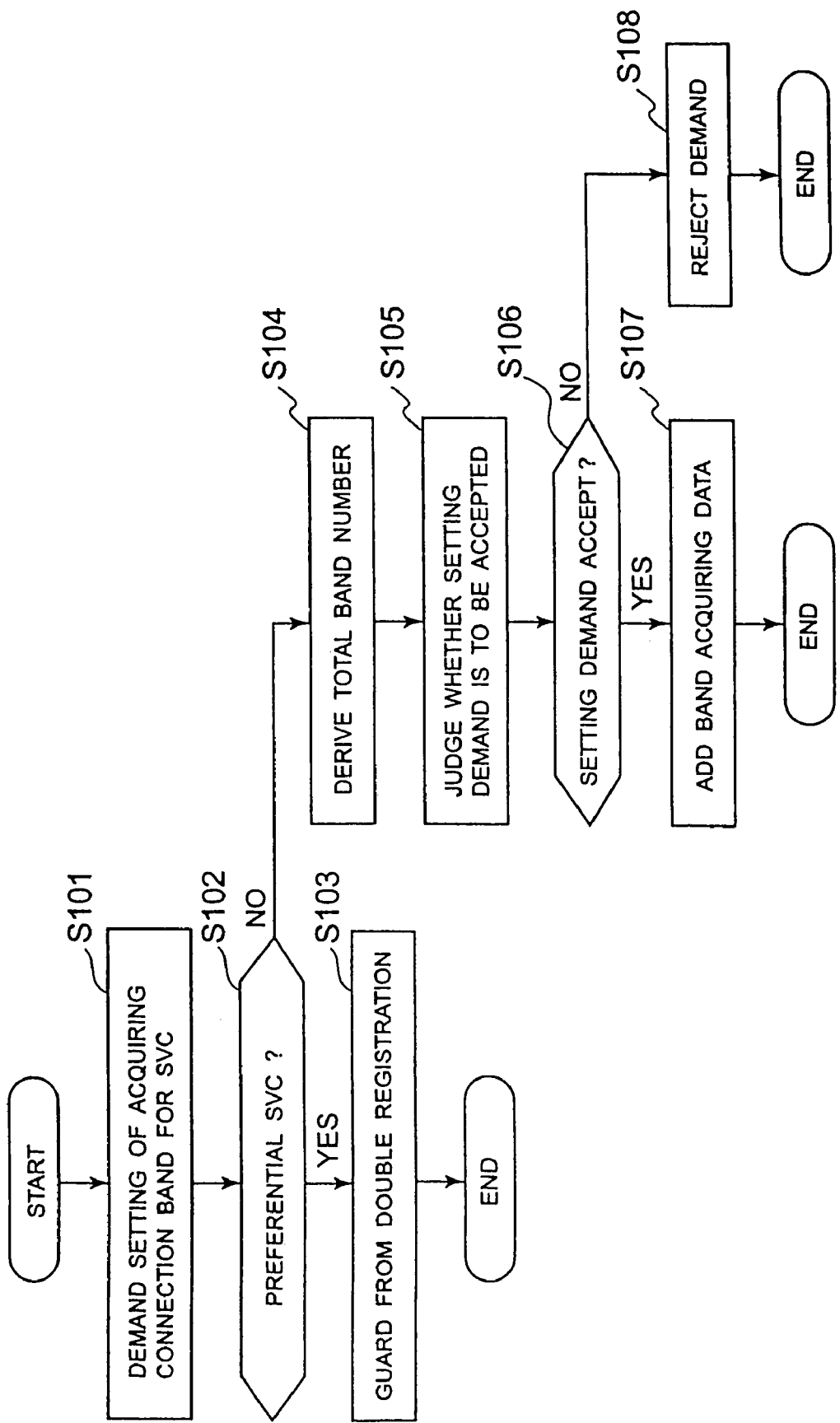
FIG. 3 is a flowchart showing operation of the first embodiment of the ATM connection band control system according to the invention.
Figure 4:
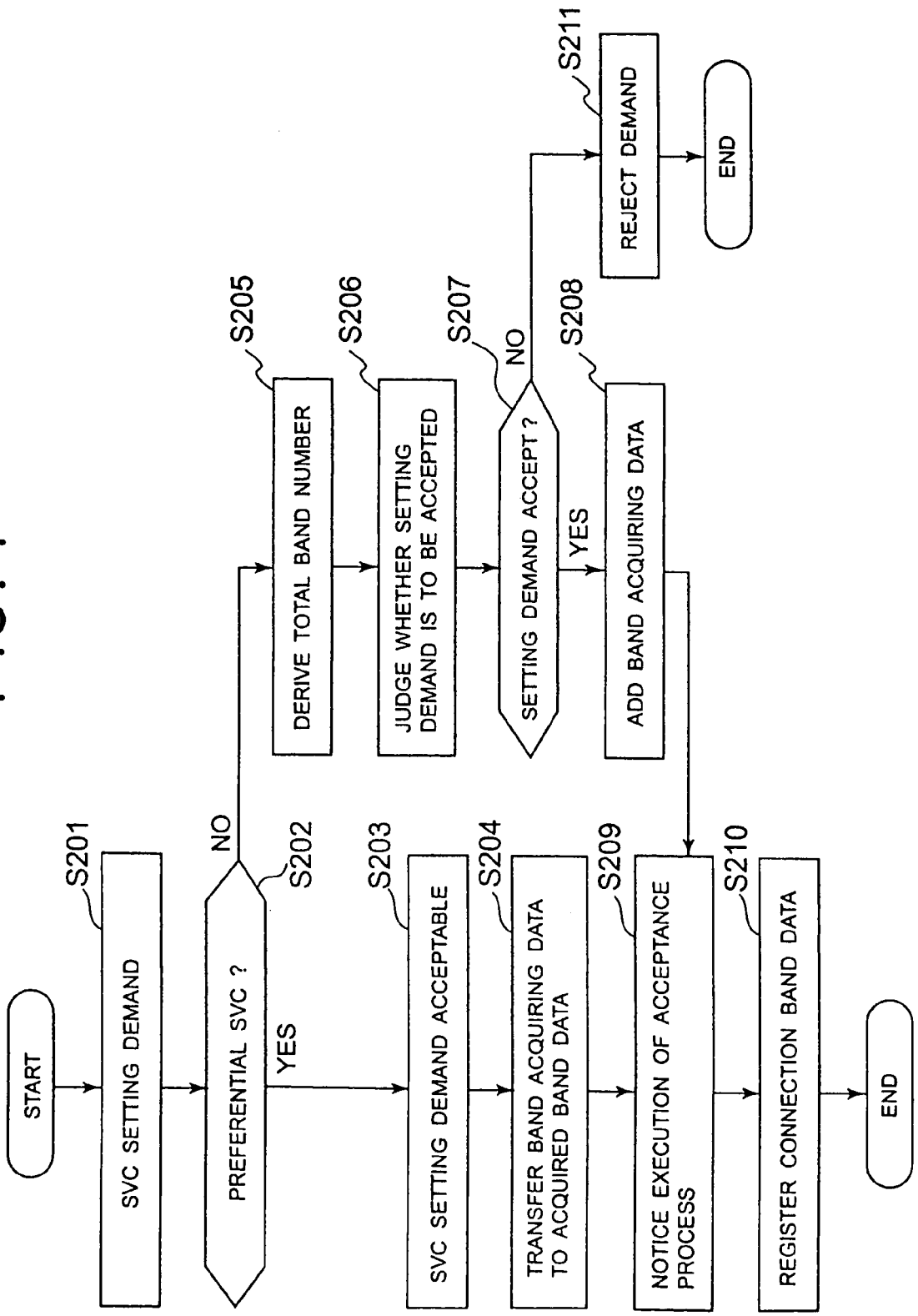
FIG. 4 is a flowchart showing operation of the first embodiment of the ATM connection band control system according to the invention.

In operational flowchart of the connection admission control of FIG. 4, upon occurrence of SVC setting demand S201, the content of the setting demand of SVC is checked to make judgment whether the SVC in question is the preferential SVC already acquired the band data presenting in the memory 262 which stores the band acquiring data of FIG. 2, at step S202. As criterion for making judgment whether the SVC setting demand is the connection setting demand of the preferential SVC, for which the band data is already acquired, or not, the judgment can be made by data which the SVC inherently have upon establishing connection, or a combination of a plurality of data similarly to step S102 of FIG. 3. By specifying the SVC, judgment is made whether the setting demanded SVC is the preferential SVC which has been acquired preliminarily or not.

Since the SVC is the preferential SVC which has been acquired the connection band via the operation flow including judgment of setting shown in FIG. 3, the result of judgment at step S202 indicates that the SVC setting demand can be admitted when the SVC for which setting is demanded is the preferential SVC for which the band data is acquired preliminarily (S203). Accordingly, the process for transferring the demanded connection band data from the memory 262 which stores band acquiring data to the memory 263 storing the acquired band data, is performed by the connection band controller 25 (S204). Then, to the connection admission control portion 24, execution of the acceptable process for the SVC setting demand is notified (S209)

On the other hand, if the SVC for which setting is demanded is not the preferential SVC preliminarily acquired the band data, the total band number is derived from the sum of the content of the memory 262 storing the band acquiring data and the content of the memory 263 storing the acquired band data, as the band admission judgment reference data (S205). Then, on the basis of the band admission judgment reference data and data necessary for other CAC, judgment is made whether the SVC setting demand is to be admitted or not by the connection band controller 25 (S206).

By the judgment whether the SVC setting demand is to be admitted or not (S207), if the SVC setting demand is judged as acceptable, process is performed in the connection band controller 25 for adding the connection band data of the demanded SVC in the memory 263 storing the acquired band data (S208). Then, similarly to the case where the SVC for which setting is demanded at step S202 is the preferential SVC for which the band data is preliminarily acquired, execution of the admission process for the SVC setting demand is notified to the connection admission control portion 24.

After notification of admission process at S209, the band data per connection declared upon SVC setting demand is registered in the memory 261 which stores the band data per connection, by the connection admission control portion 24 (S210). On the other hand, by making judgment whether the SVC setting demand is to be admitted or not at step S207, rejection of admission for the SVC setting demand is notified to the connection admission control portion 24 (S211). Then, the process of accepting connection of the SVC is terminated.

Figure 5:
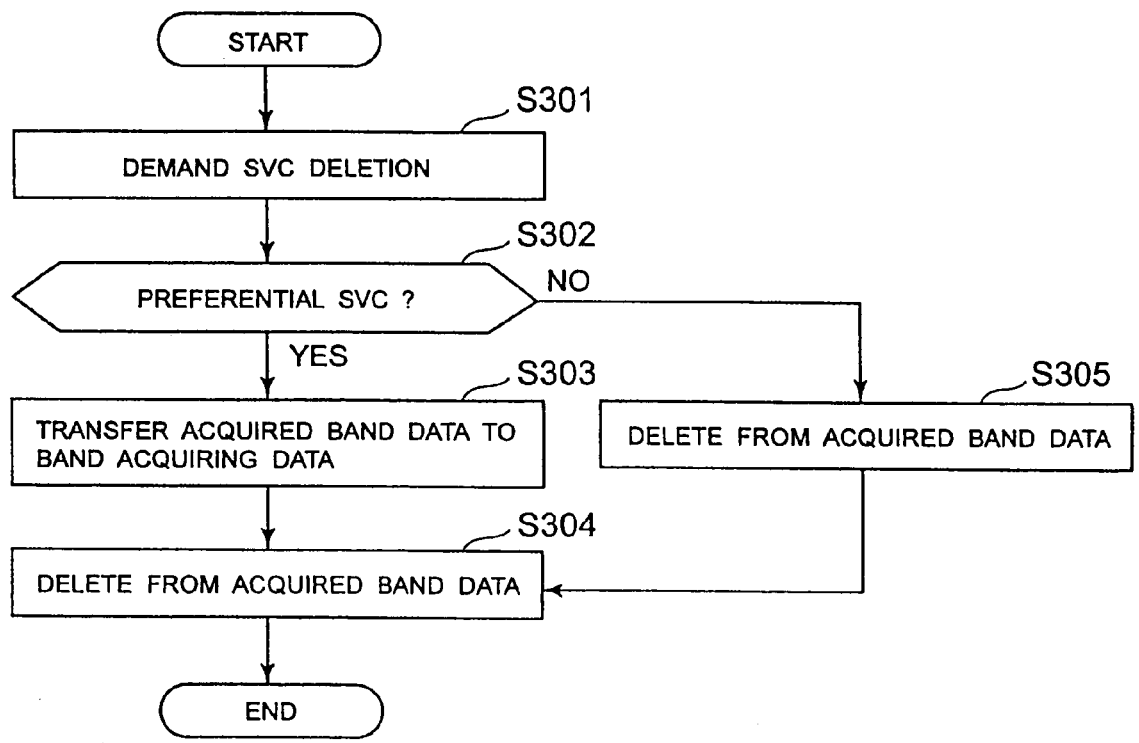
FIG. 5 is a flowchart showing operation of the first embodiment of the ATM connection band control system according to the invention.

In an operational flowchart of connection deletion control of FIG. 5, upon occurrence of SVC setting deletion demand at step S301, the SVC to be deleted is checked. At step S302, judgment is made whether the SVC in question is the preferential SVC already acquired the band data in the memory which stores the band acquiring data of FIG. 2, or not. Here, as criterion for making judgment whether the connection setting demand of the preferential SVC, for which the band data is already acquired, the judgment can be made by data which the SVC inherently have upon establishing connection, or a combination of a plurality of data similarly to step S102 of FIG. 3. By specifying the SVC, judgment is made whether the setting demanded SVC is the preferential SVC which has been acquired preliminarily.

Since the SVC is the preferential SVC which has been acquired the connection band via the operation flow including judgment of setting shown in FIG. 3, the result of judgment at step S302 indicates that the SVC for which deleting is demanded is the preferential SVC for which the band data is acquired preliminarily, the process for transferring the demanded connection band data from the memory 263 which stores acquired band data to the memory 262 storing the band acquiring data, is performed by the connection band controller 25 (S303). Then, process for the SVC setting deletion demand is executed to delete the connection band data declared upon demanding SVC setting from the memory 261 which stores the band data per connection (S304). Then, a process for deleting setting of SVC is terminated.

On the other hand, the result of judgment at step 302 indicates that the SCV for which deleting is demanded is not the preferential SVC for which the band data is acquired preliminarily, the process for deleting the deleted connection band data from the memory 263 which stores acquired band data, is performed by the connection band controller 25 (S305). Then, process for the SVC setting deletion demand is executed to delete the connection band data declared upon demanding SVC setting from the memory 261 which stores the band data per connection (S304). Then, a process for deleting setting of SVC is terminated, as the result of judgment as step 302 indicates that the SVC for which deleting is demanded is the preferential SVC for which the band data is acquired preliminarily.

Figure 6:
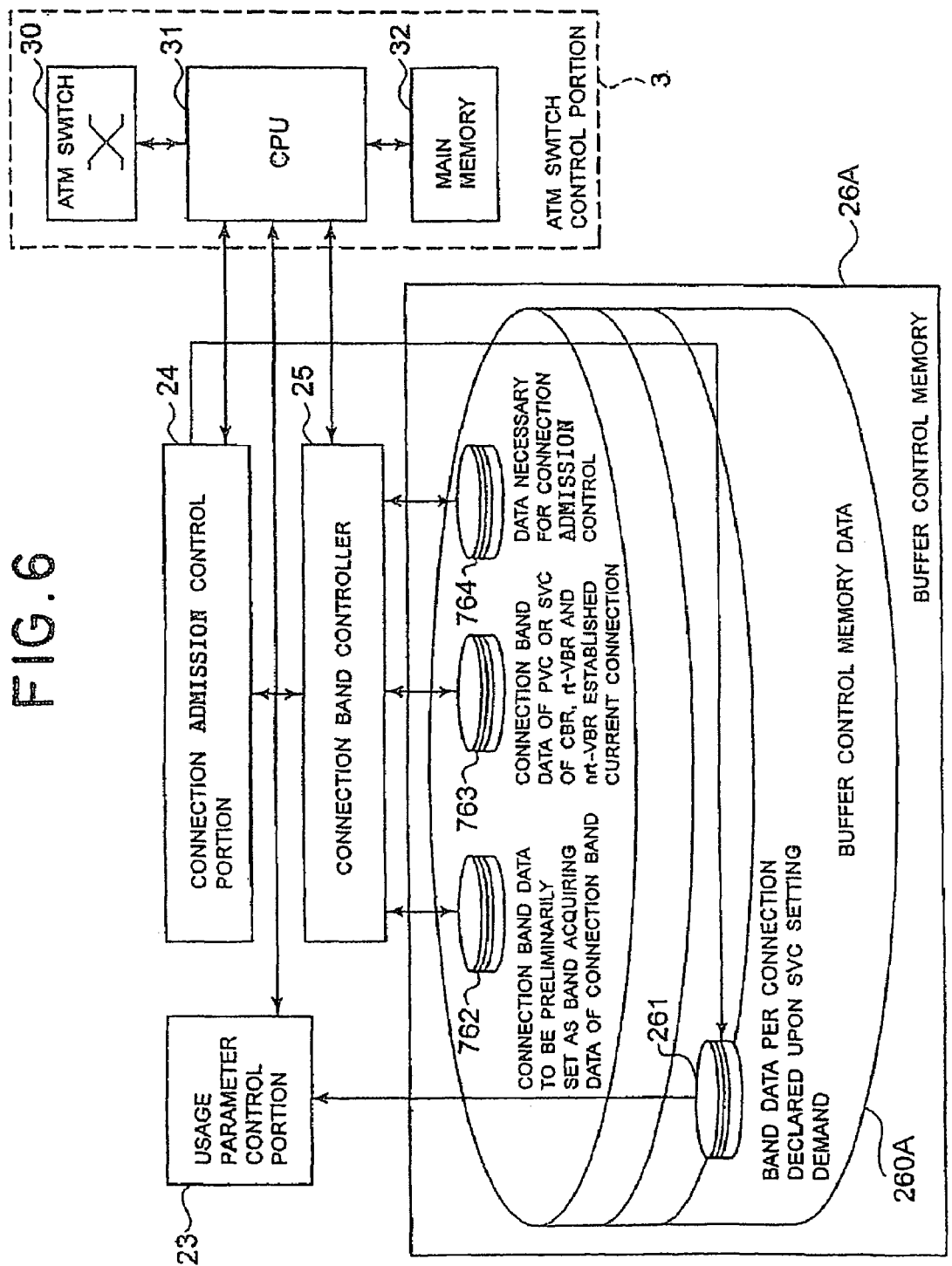
FIG. 6 is a block diagram of the major part of the second embodiment of the ATM connection band control system according to the present invention.

Next, discussion will be given for the second embodiment of the ATM connection band control system according to the present invention. In the shown embodiment illustrated in FIG. 6, the usage parameter control (UPC) portion 23 and the memory 261 storing the band data per connection declared upon SVC setting demanding performs control and function for setting and deleting connection of the SVC. On the other hand, the connection admission control (CAC) portion 24 and a memory 764 storing data necessary for other CAC, such as available band of the ATM circuit port, perform setting and deletion of connection of SVC of CBR, rt-VBR and nrt-VBR. Concerning a memory 762 storing connection band data to be preliminarily set as band acquiring data of the connection band, a memory 763 storing the connection band data of CBR, rt-VBR and nrt-VBR which has already been established connection, and the connection band controller 25 which controls these connections are performed not only for the SVC but also for permanent virtual circuit (PVC).

Concerning the permanent virtual connection (PVC), similarly to the connection band control of SVC, the memory 762 storing the band data preliminarily acquiring the connection band of the connection having high preference (hereinafter referred to as "preferential connection") irrespective of PVC, SVC for connection, such as CBR, rt-VBR, nrt-VBR of ATM service category requiring fixed band having values of a program clock reference (PCR), SCR, MBS defined in T.M4.0, the memory 763 storing the band data of the preferential connection currently established, and a memory 260A storing data necessary for other connection admission such as available band of the ATM circuit port are formed to enable preliminarily set the band acquiring data necessary for preferential connection irrespective either PVC or SVC. Also, concerning SVC, cooperation with the connection admission control is possible.

By connection band control including the band acquiring data in the connection band controller 25 irrespective of PVC, SVC, the connection band having low preference, for which constantly acquiring and guaranteeing the band is not required, is controlled within a range where band for the preferential connection is constantly acquired and guaranteed when the connection band for non-preferential connection is to be controlled. For the preferential connection, control of band of the preferential connection including admission control of the preferential SVC among the preferential connection is performed, for which the band is constantly acquired and guaranteed irrespective whether the connection of the preferential SVC is established or not. Thus, finite connection bands of each ATM circuit port can be used efficiently.

Figure 7:
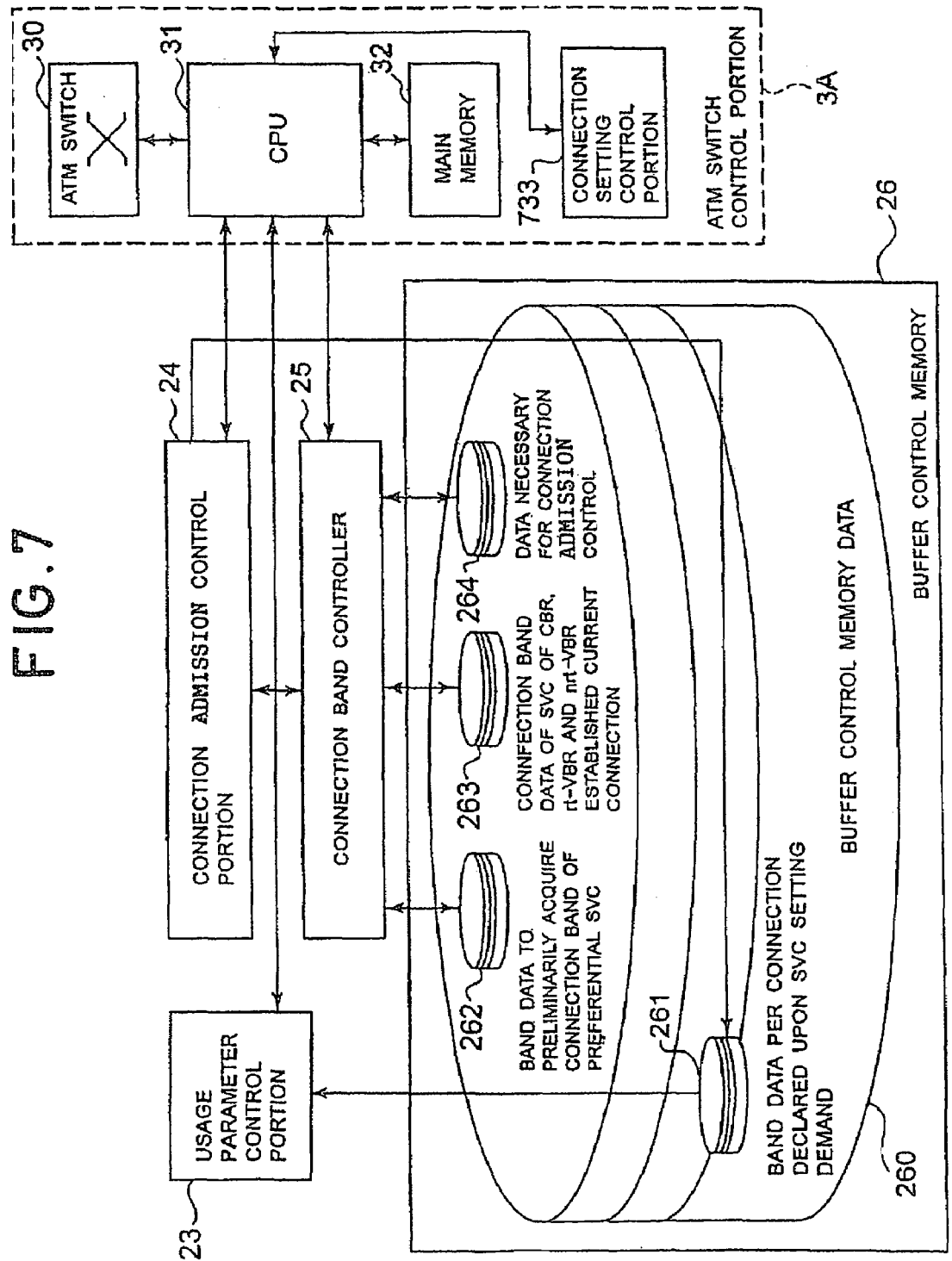
FIG. 7 is a block diagram of the major part of the third embodiment of the ATM connection band control system according to the present invention.

Next, discussion will be given for the third embodiment of the ATM connection band control system with reference to the drawings. In FIG. 7, the shown embodiment is differentiated from the ATM switch control portion in the embodiment shown in FIG. 2 in that a connection setting control portion 733 is provided in an ATM switch control portion 3A. The connection setting control portion 733 controls setting of connection of the preferential SVC, for which the required band is preliminarily set as the band acquiring data.

By this, since the band required for the preferential SVC is constantly acquired and guaranteed, the preferential SVC can be set and deleted as required by the connection setting control portion 733. For the connection of the SVC of ABR or UBR which does not require the fixed band and is not controlled by the connection admission control (CAC) portion 24 and the connection band controller 25, when the preferential SVC is unnecessary, namely when connection for the preferential SVC is not established, the band reserved for the preferential SVC is available for the SVC of ABR or UBR. Thus, the finite connection band of each ATM circuit port can be effectively used. On the other hand, when the preferential SVC becomes necessary, namely, when the connection for the preferential SVC is to be established, the band for the preferential SVC is acquired cutting into the band for the SVC of the ABR or UBR. Therefore, even when setting of connection for the preferential SVC is established later, communication of the preferential SVC can be established normally.

Next, discussion will be given for the fourth embodiment of the ATM connection band control system according to the present invention with reference to FIG. 8. The shown embodiment is differentiated from the ATM switch control portion 3 in the first embodiment shown in FIG. 2, in that a connection-setting portion 833 of an ATM switch control portion 3B is provided. Also, a memory 762 for storing band acquiring data of the preferential connection in a buffer control memory 26B and a memory 763 storing acquired band data of PVC or SVC are differentiated from the memory 262 storing the band acquiring data of the preferential SVC and the memory 263 storing the acquired band data of SVC.

Figure 8:
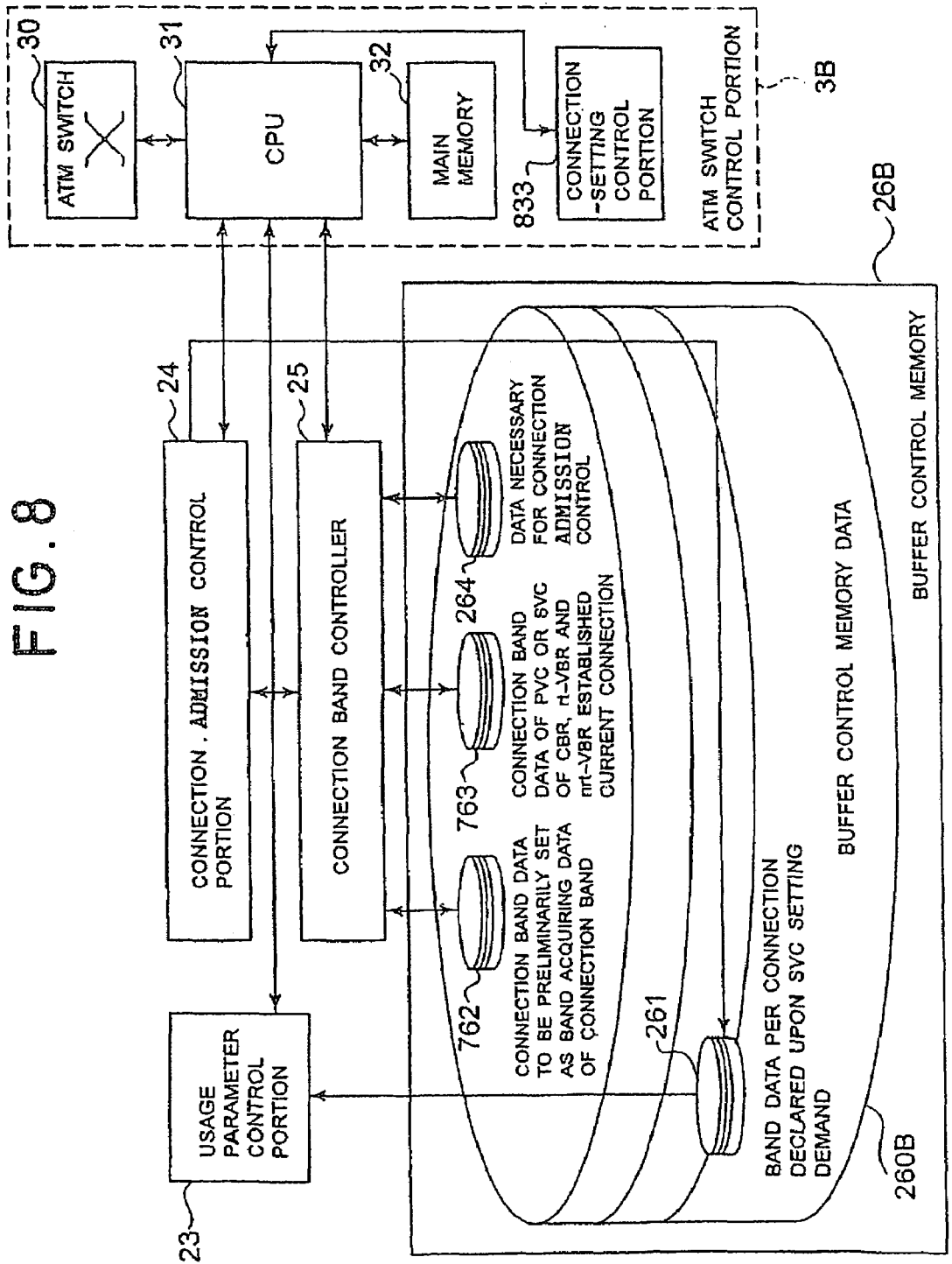
FIG. 8 is a block diagram of the major part of the fourth embodiment of the ATM connection band control system according to the present invention.
Figure 9:
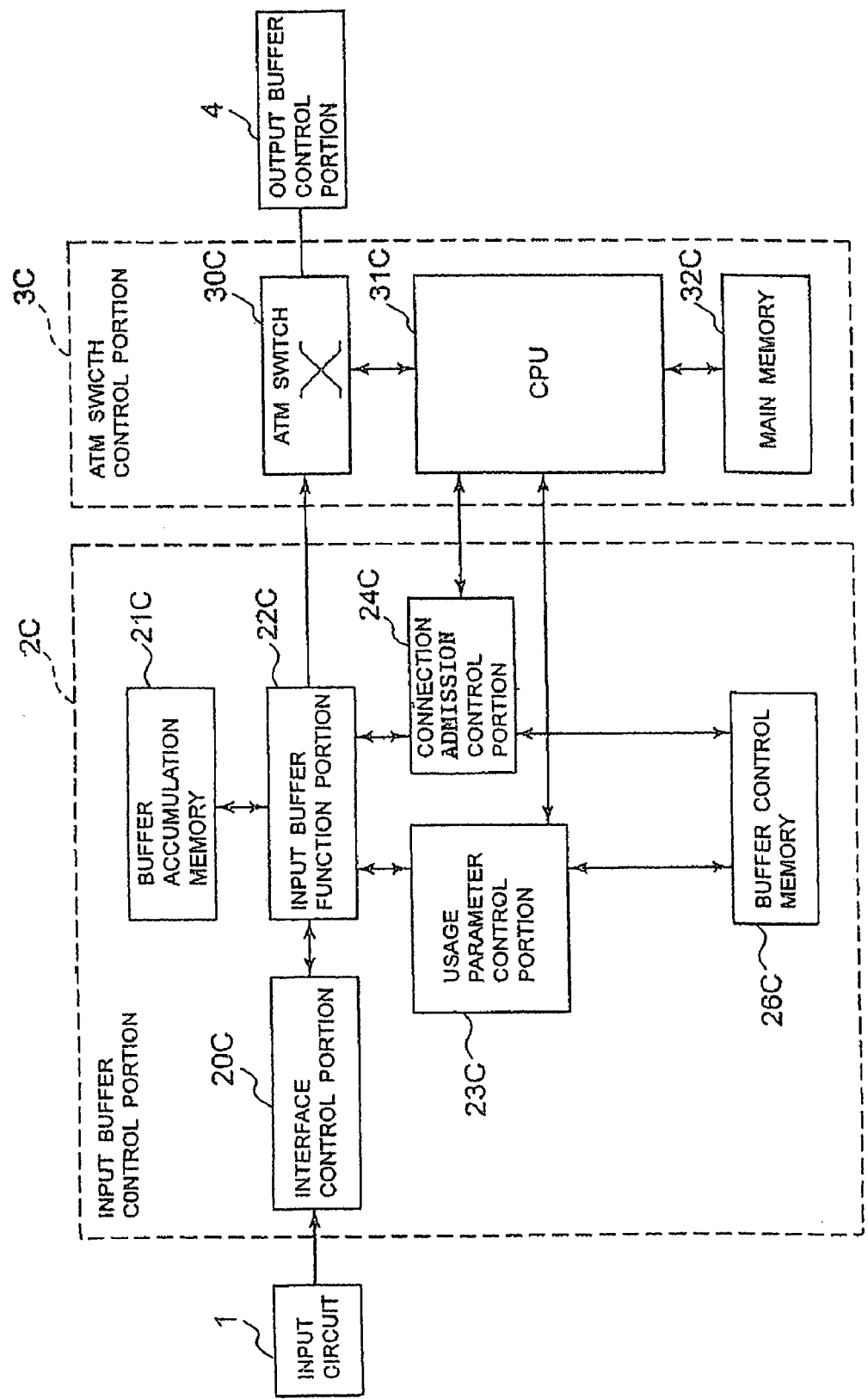
FIG. 9 is a block diagram showing the conventional ATM connection band control system.
Figure 10:
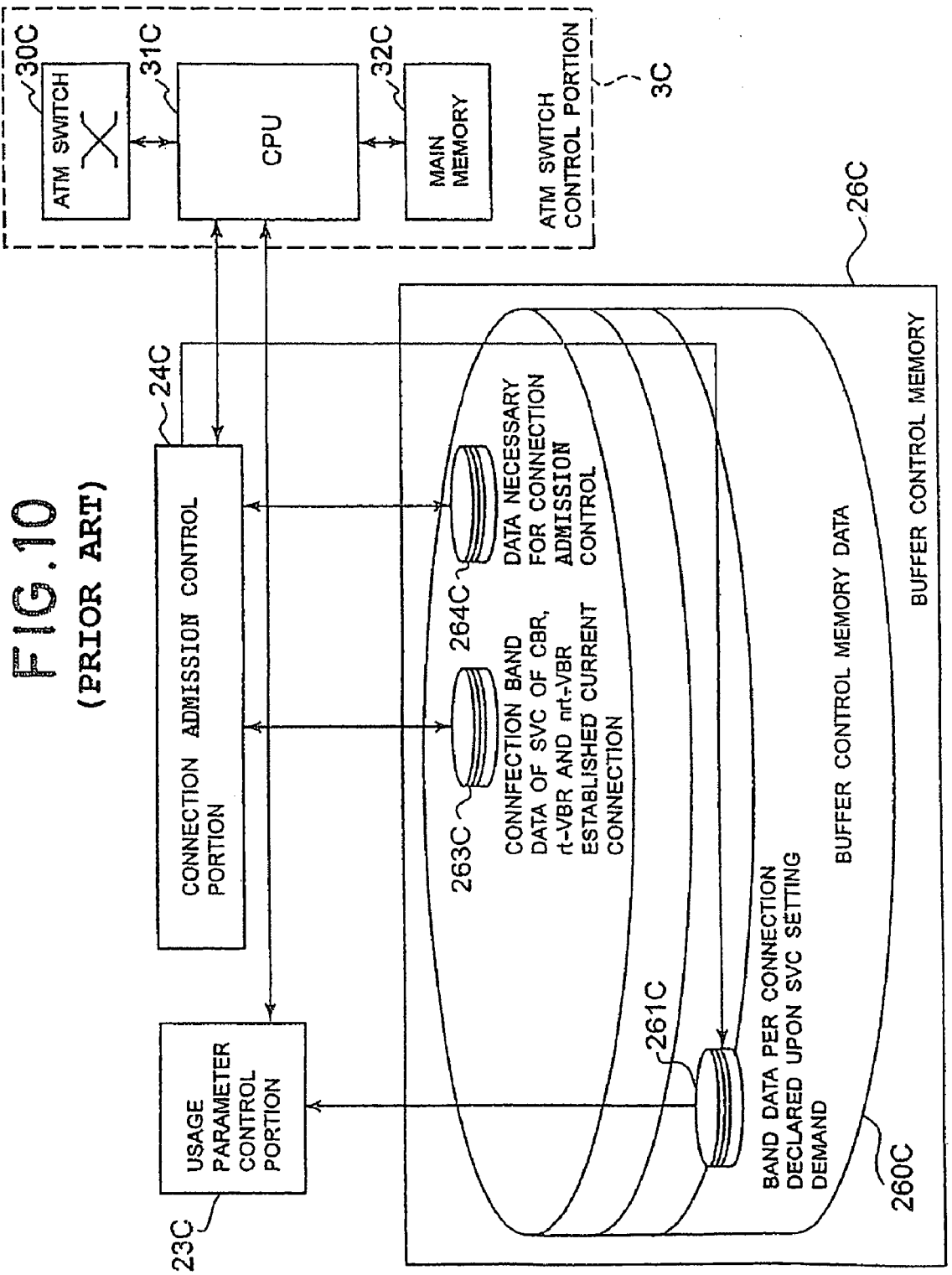
FIG. 10 is a detailed block diagram showing a part of the prior art.

The connection-setting control portion 833 of FIG. 8 controls setting of the preferential connection, for which the band required irrespective of PVC or SVC is preliminarily set as the band acquiring data.

By this, since the band necessary for the preferential connection is constantly acquired and guarantee, the preferential connection irrespective of PVC or SVC can be set and deleted as required by the connection-setting control portion 833. For the connection of the SVC of ABR or UBR which does not require the fixed band and is not controlled by the connection admission control (CAC) portion 24 and the connection band controller 25, when the preferential SVC is unnecessary, namely when connection for the preferential SVC is not established, the band reserved for the preferential SVC is available for the SVC of ABR or UBR. Thus, the finite connection band of each ATM circuit port can be effectively used.

On the other hand, when the preferential SVC becomes necessary, namely, when the connection for the preferential SVC is to be established, the band for the preferential SVC is acquired cutting into the band for the SVC of the ABR or UBR. Therefore, even when setting of connection for the preferential SVC is established later, communication of the preferential SVC can be established normally.

As set forth above, by cooperating the connection band control and the connection setting control, the band for the preferential connection can be constantly and certainly acquired and guaranteed for the preferential connection. Also, for the connection of ABR or UBR which does not require preferential connection or when the preferential connection is not established, the band becomes open to the ABR or UBR to permit effective use of finite number of connection bands in each ATM circuit port.

On the other hand, by managing the connection setting control by a schedule or the like, the necessary band is used for establishing connection only in a time zone which requires preferential connection, and in the time zone where the preferential connection is not required, control for temporarily deleting connection is performed in the connection setting control. The connection setting control is also cooperated with the connection band control, during the period where the preferential connection is temporarily deleted, the connection setting demand for the connection requiring the fixed band is not admitted, and for the connection which does not require the fixed band, the band is opened to more effectively use the finite connection bands of each ATM circuit port.

As set forth above, in the shown embodiment, by preliminarily setting the connection band for the preferential SVC in the ATM network as the band acquiring data to perform connection band control including the band acquiring data, and by cooperating with the connection admission control, during connection admission control for the SVC which has low preference and reservation of the bans is unnecessary, the band for the preferential SVC can be certainly acquired and guaranteed. On the other hand, at the same time, for the preferential SVC, connection band control including the connection admission control can be realized under the condition where the band for the preferential SVC is constantly acquired and guaranteed irrespective whether the connection is currently established or not to more effectively use the finite connection bands of each ATM circuit port.

For example, for the connection of the SVC having high preference (preferential SVC), even when established connection is temporarily broken by certain failure to open the band, the connection admission control is realized in the condition where the connection band of the preferential SVC is certainly acquired and guaranteed, for the connection setting demand of the SVC of low preference which connection of the preferential SVC is held broken. Furthermore, even when the connection setting demand of the preferential SVC is issued the acquired and guaranteed bans is again demanded to ensure establishment of connection again.

As set forth above, in accordance with the present invention, the first effect is capability of connection band control in a range where the band for the SVC of high preference and being set the band preliminarily, is acquired and guaranteed constantly upon connection admission control for the SVC of low preference and acquiring of the band being not required, by preliminarily setting the connection band of the SVC having high preference (i.e. preferential SVC) which is one of CBR, rt-VBR or the nrt-VBR requiring fixed band, and by performing connection band control with as band acquiring.

The second effect is that, with the band setting for the SVC having high preference as set forth in the first embodiment, upon connection admission control for the SVC which does not require reservation of control, and by performing connection band control in the range where the band for the SVC for which the band is reserved is constantly acquired and guaranteed, for the SVC of high preference, connection band control including connection admission control can be performed under the condition where the band for the SVC of high preference is constantly acquired and guaranteed irrespective whether the connection of the preferential SVC is established or not.

Although the present invention has been illustrated and described with respect to exemplary embodiment thereof, it should be understood by those skilled in the art that the foregoing and various other changes, omission and additions may be made therein and thereto, without departing from the spirit and scope of the present invention. Therefore, the present invention should not be understood as limited to the specific embodiment set out above but to include all possible embodiments which can be embodied within a scope encompassed and equivalent thereof with respect to the feature set out in the appended claims.

What is claimed is:

1. An asynchronous transfer mode (ATM) connection band control system in an ATM network, comprising:
    a memory to store band acquiring data associated with one or more preferential switched virtual connections (SVCs) having high preference in the ATM network, the band acquiring data including band data for preliminarily acquiring a band for the one or more preferential SVCs; and
    a control portion to perform connection admission control such that a band for one of the preferential SVCs with band acquiring data in the memory is constantly acquired and guaranteed regardless of whether a connection for the one of the preferential SVCs is established.

2. The ATM connection band control system of claim 1, wherein the control portion is further configured to permit a non-preferential SVC to use the band that is constantly acquired and guaranteed for the one of the preferential SVCs when a connection for the one of the preferential SVCs is not established.

3. The ATM connection band control system of claim 2, wherein the control portion is further configured to acquire at least some of the band from the non-preferential SVC when a connection for the one of the preferential SVCs is to be established.

4. The ATM connection band control system of claim 1, wherein a schedule identifies a time period during which a connection for the one of the preferential SVCs is to be established.

5. The ATM connection band control system of claim 4, wherein the connection for the one of the preferential SVCs is temporarily deleted outside the time period identified by the schedule.

6. The ATM connection band control system of claim 5, wherein the control portion is further configured to permit a non-preferential SVC to use the band for the one of the preferential SVCs when the connection for the one of the preferential SVCs is temporarily deleted.

7. The ATM connection band control system of claim 1, wherein the control portion is further configured to:
    determine when an established connection for the one of the preferential SVCs is broken, and
    permit a non-preferential SVC to use the band for the one of the preferential SVCs when the established connection for the one of the preferential SVCs is broken.

8. The ATM connection band control system of claim 1, wherein the one or more preferential SVCs include one or more SVCs that require a fixed band.

9. The ATM connection band control system of claim 8, wherein the one or more preferential SVCs include one or more SVCs of a constant bit rate in which traffic is generated at a constant rate or one or more SVCs of a real time variable bit rate or a non-real time variable bit rate in which traffic is generated with burst characteristics in transmission rate.

10. The ATM connection band control system of claim 1, wherein the control portion is further configured to perform connection admission control for a requesting preferential SVC that is not one of the preferential SVCs with band acquiring data in the memory by determining whether to admit the requesting preferential SVC based on the band acquiring data in the memory.

11. The ATM connection band control system of claim 10, wherein the memory is further configured to store band acquired data associated with one or more preferential SVCs that have currently established connections.

12. The ATM connection band control system of claim 11, wherein the control portion is configured to determine whether to admit the requesting preferential SVC based on both the band acquiring data and the band acquired data.

13. The ATM connection band control system of claim 1, wherein the control portion is further configured to perform connection admission control for one or more permanent virtual connections (PVCs).

14. An asynchronous transfer mode (ATM) connection band control system in an ATM network, comprising:
 a memory to store band acquiring data and band acquired data associated with a plurality of preferential switched virtual connections (SVCs) having high preference in the ATM network, the band acquiring data including band data for preliminarily acquiring a band for a first one or more of the preferential SVCs, the band acquired data including band data for a band acquired for a second one or more of the preferential SVCs that have currently established connections; and
 a control portion to determine whether to admit a preferential SVC that is not one of the first or second preferential SVCs based on the band acquiring data and the band acquired data.

15. An asynchronous transfer mode (ATM) connection band control system in an ATM network, comprising:
 a memory to store band acquiring data associated with one or more preferential switched virtual connections (SVCs) having high preference in the ATM network, the band acquiring data including band data for preliminarily acquiring a band for the one or more preferential SVCs; and
 a control portion to perform connection admission control such that a band for one of the preferential SVCs with band acquiring data in the memory is guaranteed regardless of whether a connection for the one of the preferential SVCs is established and the band for the one of the preferential SVCs is available to a non-preferential SVC when the connection for the one of the preferential SVCs is not established.

16. The ATM connection band control system of claim 15, wherein the control portion is further configured to acquire at least some of the band from the non-preferential SVC when a connection for the one of the preferential SVCs is to be established and the non-preferential SVC is using at least a portion of the band.

17. The ATM connection band control system of claim 15, wherein a schedule identifies a time period during which a connection for the one of the preferential SVCs is to be established.

18. The ATM connection band control system of claim 17, wherein the connection for the one of the preferential SVCs is temporarily deleted outside the time period identified by the schedule.

19. The ATM connection band control system of claim 18, wherein the control portion is further configured to permit the non-preferential SVC to use the band for the one of the preferential SVCs when the connection for the one of the preferential SVCs is temporarily deleted.

20. The ATM connection band control system of claim 15, wherein the control portion is further configured to:
 determine when an established connection for the one of the preferential SVCs is broken, and
 permit the non-preferential SVC to use the band for the one of the preferential SVCs while the established connection for the one of the preferential SVCs is broken.

21. The ATM connection band control system of claim 15, wherein the control portion is further configured to perform connection admission control for a requesting preferential SVC that is not one of the preferential SVCs with band acquiring data in the memory by determining whether to admit the requesting preferential SVC based on the band acquiring data in the memory.

22. The ATM connection band control system of claim 21, wherein the memory is further configured to store band acquired data associated with one or more preferential SVCs that have currently established connections.

23. The ATM connection band control system of claim 22, wherein the control portion is configured to determine whether to admit the requesting preferential SVC based on both the band acquiring data and the band acquired data.

24. The ATM connection band control system of claim 15, wherein the control portion is further configured to perform connection admission control for one or more permanent virtual connections (PVCs).

25. An asynchronous transfer mode (ATM) connection band control method performed in an ATM network, comprising:
 storing band acquiring data associated with one or more preferential switched virtual connections (SVCs) having high preference in the ATM network, the band acquiring data including band data for preliminarily acquiring a band for the one or more preferential SVCs;
 guaranteeing a band for one of the preferential SVCs with band acquiring data in the memory regardless of whether a connection for the one of the preferential SVCs is established; and
 permitting a non-preferential SVC to use the band for the one of the preferential SVCs when the connection for the one of the preferential SVCs is not established.

26. An asynchronous transfer mode (ATM) connection band control system in an ATM network, comprising:
 means for storing band acquiring data associated with a plurality of first preferential switched virtual connections (SVCs) having high preference in the ATM network, the band acquiring data including band data for preliminarily acquiring a band for the first preferential SVCs;
 means for storing band acquired data associated with a plurality of second preferential SVCs having high preference in the ATM network, the band acquired data including band data for a band acquired for the second preferential SVCs that have currently established connections; and
 means for determining whether to admit a preferential SVC that is not one of the first or second preferential SVCs based on the band acquiring data and the band acquired data.

* * * * *